United States Patent
Kelly et al.

(10) Patent No.: US 6,528,581 B1
(45) Date of Patent: Mar. 4, 2003

(54) COATING BITUMINOUS SUBSTRATES

(75) Inventors: David Goodro Kelly, Ambler; Huiling Yang, Dresher; Donald Alfred Winey, Warminster, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/293,301

(22) Filed: Apr. 16, 1999

(30) Foreign Application Priority Data

Mar. 5, 1999 (FR) .......................................... 99 02791

(51) Int. Cl.[7] .............................................. C08L 31/00
(52) U.S. Cl. .................... 524/833; 524/832; 526/318.4; 526/318.44; 526/328; 526/328.5; 526/329; 526/329.2
(58) Field of Search .................. 526/318.4, 318.44, 526/328, 328.5, 329, 329.2

(56) References Cited

U.S. PATENT DOCUMENTS 5,059,456 A * 10/1991 Larson et al. ............ 427/407.1
5,112,655 A * 5/1992 Larson et al. ............ 427/407.1

* cited by examiner

*Primary Examiner*—Helen L. Pezzuto
(74) *Attorney, Agent, or Firm*—Karl Stauss

(57) ABSTRACT

The quality of a mastic coating system for bituminous substrates is improved through the use of a topcoat composition and/or tiecoat composition comprising a water-insoluble latex polymer. The latex polymer has a Tg of from $-25°$ C. to $20°$ C. and is prepared from a monomer mixture comprising:

(a) at least 20% by weight of at least one hydrophobic monomer selected from the group consisting of ($C_8$ to $C_{24}$) alkyl (meth)acrylates;

(b) 0 or up to 45% by weight of at least one vinyl aromatic monomer; wherein the weight of (a) and (b) together constitute at least 25% by weight of said monomer mix (c) 0 or up to 75% by weight of at least one monomer selected from the group consisting (C1 to C4) alkyl (meth)acrylates; and (d) 0 or up to 5% by weight of at least one monomer selected from acrylic or methacrylic acid;

wherein when (b) is not present in the monomer mix the amount of (d) is in the range from 0 or up to less than 3% by weight. The mastic coating system has increased adhesion and blistering resistance when the coating is exposed to ponded water and may have reduced bleedthrough of chemicals from the bituminous substrate.

5 Claims, No Drawings

COATING BITUMINOUS SUBSTRATES

This invention is concerned with coating bituminous substrates. More particularly, though not exclusively, this invention is concerned with a method for improving the quality of a mastic coating system.

A large proportion of the roofing market utilizes asphalt-based products, for example, modified bituminous rolls, as a base substrate which is then topcoated with conventional roof mastics to improve durability (asphalt degradation), provide energy savings (white coating vs. black asphalt), reduce the fire rating and improve aesthetics. Such coatings are frequently referred to as "roof mastics" although "mastic coatings" as used herein includes any such thick coatings applied to a substantially horizontal surface such as, for example, a roof deck, to a substantially vertical surface such as, for example, a wall, or to other substrate surfaces. Unfortunately, these mastic coatings have deficiencies. A roof deck, or other surfaces, by design or because of imperfections, may retain water. This ponded water results in loss of adhesion and blistering leading to failure of the mastic coating. There is also a tendency for mastic coatings to become discolored by the bleedthrough of black chemicals from the asphaltic substrate on which the mastic is applied.

A mastic coating system which displays good adhesion and superior resistance to blistering especially when exposed to ponded water is disclosed in U.S. Pat. No. 5,059,456. This system relies upon the use of a water-based tiecoat between the substrate and the mastic coating. The tiecoat consists of a water-insoluble latex polymer and multivalent metal ion, wherein the latex polymer comprises units such as would result from preparation from a monomer mixture comprising at least 20 weight %, based on the weight of the monomer mixture, of at least one hydrophobic monomer selected from the group consisting of ($C_4$–$C_{20}$)-alkyl methacrylates and ($C_8$–$C_{20}$)-alkyl acrylates, and from 3.0 weight % to 7.5 weight % of methacrylic acid, based on the weight of the monomer mixture, and where the latex polymer has a glass transition temperature of from –20° C. to 5° C., and where the molar ratio of the multivalent metal ion to the methacrylic acid in the latex polymer is from about 1:1 to about 0.375:1. The tiecoat is applied to a substrate before subsequent application of a mastic coating. Though this system offers properties of adhesion and resistance to blistering which are superior to conventional mastic systems, there remains a desire to improve upon these properties.

It is an object of the present invention to provide a mastic coating system which offers improved adhesion and resistance to blistering over those described in U.S. Pat. No. 5,059,456. Moreover, it is preferred if the above improvements in the quality of a mastic coating system can be achieved with a system which does not essentially rely upon the use of a tiecoat between the substrate and mastic composition.

In accordance with the present invention, there is provided a method for improving the quality of a mastic coating system comprising:

(A) forming a mastic topcoat composition and optionally a tiecoat composition;

(B) optionally applying said tiecoat composition onto a bituminous substrate;

(C) applying said mastic topcoat composition either onto a bituminous substrate directly or, when present, onto said tiecoat composition which has already been applied onto said bituminous substrate;

wherein at least one of said mastic topcoat composition and said optional tiecoat composition comprises a water-insoluble latex polymer;

wherein said latex polymer has a Tg of from –25° C. to 20° C., preferably from –10° C. to 0° C., and is prepared from a monomer mixture comprising:

(a) at least 20%, preferably from 30 to 70%, by weight, of at least one hydrophobic monomer selected from the group consisting of ($C_8$ to $C_{24}$) alkyl (meth)acrylates;

(b) 0 or up to 45%, preferably 0 or up to 35%, more preferably 0 or up to 10%, by weight of at least one vinyl aromatic monomer;

(c) 0 or up to 75%, preferably up to 74.5%, more preferably 5 to 70%, even more preferably 5 to 50%, by weight of at least one monomer selected from the group consisting of ($C_1$ to $C_4$) alkyl (meth)acrylates; and (d) 0 or up to 5%, preferably from 0.5 to 2.5%, by weight of at least one monomer selected from acrylic or methacrylic acid;

provided that when (b) is not present in the mixture the amount of (d) is in the range from 0 or up to less than 3%, preferably 0.05 to less than 3% by weight; and wherein the weight of (a) and (b) together constitute at least 25%, preferably 30% or more, more preferably 35% or more, even more preferably 45% or more, by weight of said monomer mix.

In another aspect, the present invention provides a composition suitable for use as a mastic topcoat composition or a mastic tiecoat composition comprising a water-insoluble latex polymer; wherein said latex polymer has a Tg of from –25° C. to 20° C., preferably from –10° C. to 0° C., and is prepared from a monomer mixture comprising:

(a) at least 20%, preferably from 30 to 70%, by weight, of at least one hydrophobic monomer selected from the group consisting of ($C_8$ to $C_{24}$) alkyl (meth)acrylates;

(b) 0 or up to 45%, preferably 0 or up to 35%, more preferably 0 or up to 10%, by weight of at least one vinyl aromatic monomer;

(c) 0 or up to 75%, preferably up to 74.5%, more preferably 5 to 70%, even more preferably 5 to 50%, by weight of at least one monomer selected from the group consisting of ($C_1$ to $C_4$) alkyl (meth)acrylates; and (d) 0 or up to 5%, preferably from 0.5 to 2.5%, by weight of at least one monomer selected from acrylic or methacrylic acid;

provided that when (b) is not present in the mixture the amount of (d) is in the range from 0 or up to less than 3%, preferably 0.05 to less than 3% by weight; and wherein the weight of (a) and (b) together constitute at least 25%, preferably 30% or more, more preferably 35% or more, even more preferably 45% or more, by weight of said monomer mix.

In yet another aspect, the present invention provides the use in a mastic coating system to improve adhesion and resistance to blistering of a mastic topcoat of a water-insoluble latex polymer; wherein said latex polymer has a Tg of from –25° C. to 20° C., preferably from –10° C. to 0° C., and is prepared from a monomer mixture comprising:

(a) at least 20%, preferably from 30 to 70%, by weight, of at least one hydrophobic monomer selected from the group consisting of ($C_8$ to $C_{24}$) alkyl (meth)acrylates;

(b) 0 or up to 45%, preferably 0 or up to 35%, more preferably 0 or up to 10%, by weight of at least one vinyl aromatic monomer;

(c) 0 or up to 75%, preferably up to 74.5%, more preferably 5 to 70%, even more preferably 5 to 50%, by weight of at least one monomer selected from the group consisting of ($C_1$ to $C_4$) alkyl (meth)acrylates; and (d) 0 or up to 5%, preferably from 0.5 to 2.5%, by weight of at least one monomer selected from acrylic or methacrylic acid;

provided that when (b) is not present in the mixture the amount of (d) is in the range from 0 or up to less than 3%, preferably 0.05 to less than 3% by weight; and wherein the weight of (a) and (b) together constitute at least 25%, preferably 30% or more, more preferably 35% or more, even more preferably 45% or more, by weight of said monomer mix.

Preferably at least one of (b) and (d) is present in the monomer mixture.

Mastic coating systems employing the topcoat and/or tiecoat of this invention display surprisingly improved adhesion and resistance to blistering, especially when exposed to ponded water. They are also resistant to bleedthrough of dark chemicals from the bituminous substrate.

A common substrate for application of the invention is modified bituminous sheet.

The latex polymer can be prepared by emulsion polymerization techniques well known in the art. For example, U.S. Pat. No. 5,521,266 discloses a very suitable process of aqueous polymerization suitable for forming polymers containing monomers having low water solubility.

The at least one hydrophobic monomer (a) is preferably selected from the group consisting of ethylhexyl acrylate (EHA), octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA) and the (C12 to C15) alkyl methacrylates. LMA, IDMA and the (C12 to C15) alkyl methacrylates are the most preferred monomers.

The at least one hydrophobic monomer (a) is most preferably present in the monomer mix in an amount of from 30 to 70% by weight.

The at least one vinyl aromatic monomer is preferably selected from the group consisting of styrene (Sty), vinyl toluene, 2-bromo styrene, o-bromo styrene, p-chloro styrene, o-methoxy styrene, p-methoxy styrene, allyl phenyl ether, allyl tolyl ether and alpha-methyl styrene. Styrene is the most preferred monomer.

The at least one vinyl aromatic monomer is preferably present in the monomer mix in an amount of less than 35%, more preferably 0 or up to 10%, by weight.

The preferred ($C_1$ to $C_4$) alkyl (meth)acrylates are methyl methacrylate (MMA), ethyl acrylate (EA), and butyl acrylate (BA).

The monomer mixture used to prepare the latex polymer preferably contains from about 0.5 wt. % to less than 3% (based on the weight of total monomers) of methacrylic acid. A preferred level of methacrylic acid is from 1 to 2%.

"Glass transition temperature", or "Tg", used herein means the mid-point glass transition temperature of a polymer as determined by differential scanning calorimetry, in accordance with ASTM E-1356-91.

The monomer components of the latex polymer should be selected such that the Tg of the dried latex polymer is from −25° C. to +20° C., and a Tg of −10° C. to 0° C. is preferred. Polymers having Tg's above +5° C. yield coatings which may lose their flexibility at low temperature. Polymers having Tg's below −25° C. are prone to bleed-through wherein the colored chemicals in the substrate migrate into the topcoat and tiecoat and deteriorate the performance of the mastic coating system.

The molecular weight of the latex polymer influences blister resistance and adhesion. Reducing the molecular weight of the polymer improves blister resistance and adhesion. Preferably, the latex polymer has a weight average molecular weight from about 10,000 to about 150,000 gives the best resistance to blistering and adhesion. Molecular weight can be controlled by a wide variety of chain transfer agents, as is well known to those skilled in the art. These include, for example, alkyl mercaptans, halogen compounds, and other well-known agents. A chain transfer agent such as, for example, n-dodecyl mercaptan (n-DDM), used at the level of about 0.1 wt. % (based on the weight of total monomers) to about 2.5 wt. % may be effective in providing the desired molecular weight. Weight average molecular weight (Mw) is determined by aqueous gel permeation chromatography.

Mastic topcoat compositions and tiecoat compositions of the present invention will typically comprise, in addition to the latex polymer, at least one or more of the following components: pigments, extenders, dispersants, surfactants, coalescents, wetting agents, thickeners, rheology modifiers, drying retarders, plasticizers, biocides, mildewicides, defoamers, colorants, waxes, adhesion promoters, zinc oxide and solid silica. Said compositions may also comprise one or more other latex polymers which substitute in part the water-insoluble latex polymer defined above.

Mastic topcoat compositions of the present invention will always comprise a pigment, such as for example titanium dioxide or Ropaque opaque polymer from Rohm and Haas Company.

Mastic topcoat and tiecoat compositions of the present invention will usually comprise a biocide and/or mildewicide, such as Kathon 887 or Skane M-8 from Rohm and Haas Company.

Tiecoat compositions of the present invention based on latex polymers having Tg's of about −25° C. to about +5° C. are not sufficiently tack free at the temperatures at which roofing materials are normally applied. Therefore, it is preferable to incorporate into said tiecoat compositions a compound, such as a multivalent metal ion complex, to achieve a tack-free coating. Multivalent metal ions such as calcium, magnesium, zinc, barium and strontium ions, may be used. Complexes of multivalent metal ions, such as zinc hexammonia and the like, and salts of multivalent metal ions with counterions, such as chloride, acetate, bicarbonate and the like, may be used to supply the ions. Zinc is the preferred multivalent metal ion. The level of multivalent metal ion in the tiecoat composition can be controlled to achieve a tack-free coating and this is accomplished by controlling the molar ratio of added multivalent metal ion to methacrylic acid in the polymer tiecoat. Molar ratios of multivalent metal ion/methacrylic acid as low as about 0.375:1 and as high as about 1:1 can be used. A molar ratio of about 0.5:1 is preferred.

The following Examples, including Comparative Examples, are given solely for the purpose of illustrating details of the invention and are in no way limiting.

EXAMPLE 1.

Preparation of Comparative Latex Polymer A

The latex polymer was prepared in a conventional manner (see for example, U.S. Pat. No. 5,356,968, EXAMPLE 1) from a mixture of 1323.0 g of butyl acrylate, 684.6 g of methyl methacrylate and 17.1 g of methacrylic acid over the course of 3 hr and 20 min. at 84° C. The amount of water was 1648.8 g; the free radical initiator used was 5.6 g of ammonium persulfate and the emulsifier employed was 2.0 g of sodium dodecyl benzene sulfonate. The resultant polymer latex had a total solids of 55.7% (theoretical solids was 55.9); a pH of 9.7, an average particle size of 337 nm (Brookfield Particle Size Analyzer, Model BI-90), a viscosity of 0.200 Pa·s (Brookfield Viscometer, Spindle #2, 60 rpm), a mid-point glass transition temperature determined by Differential Scanning Calorimetry of −6.6° C. The weight average molecular weight was greater than 500,000.

EXAMPLE 2.

Preparation of Comparative Latex Polymer B

The latex polymer was prepared in a conventional manner (see for example, U.S. Pat. No. 5,356,968, EXAMPLE 1) from a mixture of 1188.0 g of butyl acrylate, 552.6 g of methyl methacrylate, 59.4 g of methacrylic acid and 5.4 g of n-dodecyl mercaptan over the course of 3 hr at 84° C. The amount of water was 1474 g; the free radical initiator used was ammonium persulfate and the emulsifier employed was 3.6 g of sodium dodecyl sulfate. The resultant polymer latex had a total solids of 55.60% (theoretical solids was 55.96); a pH of 7.2, an average particle size of 338 nm (Brookfield Particle Size Analyzer, Model BI-90), a viscosity of 0.128 Pa·s (Brookfield Viscometer, Spindle #2, 60 rpm), a mid-point glass transition temperature determined by Differential Scanning Calorimetry of −0.8° C. and a weight average molecular weight of 170,000.

EXAMPLE 3.

Preparation of Latex Polymer 1

The latex polymer was prepared in a conventional manner (see for example, U.S. Pat. No. 5,356,968, EXAMPLE 1) from a mixture of 543.6 g of butyl acrylate, 270 g of methyl methacrylate, 201.6 g of styrene, 756 g of isodecyl methacrylate, 28.8 g of methacrylic acid and 5.4 g of n-dodecyl mercaptan over the course of 3 hr at 84° C. The amount of water was 1474 g; the free radical initiator used was ammonium persulfate and the emulsifier employed was 3.6 g of sodium dodecyl sulfate. The resultant polymer latex had a total solids of 55.7% (theoretical solids was 55.9%); a pH of 6.7, an average particle size of 332 nm (Brookfield Particle Size Analyzer, Model BI-90), a viscosity of 0.135 Pa·s (Brookfield Viscometer, Spindle #2, 60 rpm), a mid-point glass transition temperature determined by Differential Scanning Calorimetry of −6.1° C. and a weight average molecular weight of 92,000. Various other polymer compositions of the present invention as illustrated were made substantially according to the preparation of Latex Polymer 1.

TABLE 1

Compositions (weight percentage) of various latex polymers prepared according to Latex Polymer 1.

| Latex # | BA | MMA | Sty | MAA | Hydrophobic | Tg |
|---|---|---|---|---|---|---|
| 1 | 30.2 | 15 | 11.2 | 1.6 | 42 IDMA | −6 |
| 2 | 33 | | 30.7 | 3.3 | 33 IDMA | 4 |
| 3 | 18 | | 28.7 | 3.3 | 50 IDMA | 5 |
| 4 | | | 40.4 | 3.3 | 56.3 LMA | 10 |
| 5 | | | 26.7 | 3.3 | 70.0 IDMA | 14 |
| 6 | 22.7 | | 22.4 | 3.4 | 51.5 IDMA | −6 |
| 7 | | | 37.4 | 3.3 | 59.3 EHA | −8 |
| 8 | 18 | | 28.7 | 3.3 | 50 nDMA | −10 |
| 9 | | | 30.7 | 3.3 | 66 LMA | −5 |
| 10 | 10 | | 36.7 | 3.3 | 50 SMA | 4 |
| 11C | 28.1 | 40.4 | | 3.3 | 28.2 LMA | 18 |
| 12 | 28.1 | 20.2 | 20.2 | 3.3 | 28.2 LMA | 11 |
| 13 | 28.1 | | 40.4 | 3.3 | 28.2 LMA | 10 |
| 14 | | 20.2 | 20.2 | 3.3 | 56.3 LMA | 20 |
| 15 | 26 | | 25.9 | 1.1 | 47 IDMA | −7 |
| 16 | 26 | | 24.5 | 2.5 | 47 IDMA | −5 |
| 17 | 31.1 | 25.3 | | 1.6 | 42 IDMA | 4 |

TABLE 1-continued

Compositions (weight percentage) of various latex polymers prepared according to Latex Polymer 1.

| Latex # | BA | MMA | Sty | MAA | Hydrophobic | Tg |
|---|---|---|---|---|---|---|
| 18C | 18 | 28.7 | | 3.3 | 50 IDMA | 15 |
| 19C | 22.7 | 22.4 | | 3.4 | 51.5 | 0 |
| B comp | 66 | 30.7 | | 3.3 | | −1 |
| A comp | 65.4 | 33.8 | | 0.8 | | −5 |
| 20 | 35.7 | 26.9 | | 1.6 | 35.8 IDMA | −3 |
| 21 | 18 | 20.4 | | 1.6 | 60 IDMA | −6 |
| 22 | 38 | 30.4 | | 1.6 | 30 LMA | −8 |
| 23 | 20 | 28.4 | | 1.6 | 50 LMA | −9 |

Mastic coatings can be prepared with various combinations of ingredients. Below, we show three examples that we have used for testing of mastic coating performance on APP mod-bit. Mastic coating 1 shown in example 4 is made with the Standard latex polymer shown in example 1.

EXAMPLE 4

Preparation of Mastic Coating 1

| Material Name | Weight (g) |
|---|---|
| The following ingredients were combined and mixed for 15 minutes on a high speed Cowles disperser | |
| Water | 160.5 |
| Dispersant (Tamol ® 901) | 5.0 |
| Defoamer (Nopco ® NXZ) | 2.0 |
| Potassium tripolyphosphate | 1.5 |
| Calcium Carbonate (Duramite ®) | 383.2 |
| Titanium Dioxide (Ti-Pure ® R-960) | 73.7 |
| The mixing speed was reduced and the following ingredients were added | |
| standard latex polymer A | 492.7 |
| Defoamer (Nopco ® NXZ) | 2.0 |
| Coalescent (Texanol ®) | 7.3 |
| Preservative (Skane ® M-8) | 1.0 |
| Ethylene Glycol | 25.5 |
| Hydroxyethyl Cellulose (Natrosol ® 250 MXR) | 4.4 |

Mastic coatings 2 and 3 were prepared for use with the latex polymers made according to the preparation for latex polymer 1.

EXAMPLE 5

Preparation of Mastic Coating 2

| Material Name | Weight (g) |
|---|---|
| The following ingredients were combined and mixed for 15 minutes on a high speed Cowles disperser | |
| Water | 109.4 |
| Dispersant (Tamol ® 165A) | 8.8 |
| Defoamer (Nopco ® NXZ) | 3.0 |
| Aqueous Ammonia (28%) | 3.0 |
| Calcium Carbonate (Duramite ®) | 409.6 |
| Titanium Dioxide (Ti-Pure ® R-960) | 65.2 |
| The mixing speed was reduced and the following ingredients were added | |
| Water | 16.6 |
| Surfactant (Triton ® X-405) | 1.0 |

-continued

| Material Name | Weight (g) |
| --- | --- |
| Defoamer (Nopco ® NXZ) | 3.0 |
| Coalescent (Texanol ®) | 6.2 |
| Latex Polymer (55% solids) | 521.4 |
| Thickener #1 (Acrysol ® RM-12W) | 0.6 |
| Thickener #2 (Acrysol ® RM-8W) | 1.6 |

EXAMPLE 6

Preparation of Mastic Coating 3

| Material Name | Weight (g) |
| --- | --- |
| The following ingredients were combined and mixed for 15 minutes on a high speed Cowles disperser | |
| Water | 126.7 |
| Dispersant (Tamol ® 165A) | 4.0 |
| Defoamer (Nopco ® NXZ) | 3.0 |
| Aqueous Ammonia (28%) | 2.0 |
| Calcium Carbonate (Camel-TEX ®) | 411.5 |
| Titanium Dioxide (Ti-Pure ® R-960) | 65.5 |
| The mixing speed was reduced and the following ingredients were added | |
| Water | 5.1 |
| Preservative (Skane ® M-8) | 3.0 |
| Defoamer (Nopco ® NXZ) | 3.0 |
| Coalescent (Texanol ®) | 6.3 |
| Latex Polymer (55% solids) | 513.8 |
| Thickener #1 (Acrysol ® RM-12W) | 0.5 |
| Thickener #2 (Acrysol ® RM-8W) | 1.0 |
| Thickener #3 (Acrysol ® RM-2020NPR) | 2.5 |

Testing of Mastic Systems

The substrate for all the tests was atactic polypropylene-modified bituminous roofing material manufactured by US Intec (Brai® SP4).

Blistering of Mastic Systems

Samples for blistering measurement were prepared by cutting a 14 cm strip across one half of the APP mod-bit modified bitumen roll. The coating was applied to the APP mod-bit sample at a wet thickness of 0.64 mm using a drawdown bar manufactured by Paul & Gardner Co., Incorporated. After allowing the samples to dry for 24 hours at 24° C. and 50% relative humidity, they were cut into 8 cm sections. The samples were placed under 4 cm of deionized water, and examined after the first day, and after 14 days. The level of blistering was rated against standards according to ASTM D-714.

Coating Bleedthrough (Yellowing)

Additional samples prepared in the same way were exposed to artificial weathering conditions in an Atlas Weather-O-Meter® according to ASTM G-26 (modified to 0.30 W/m$^2$ irradiance). After 330 hours exposure, the samples were removed and the degree of yellowing determined. The degree of bleedthrough or discoloration was determined using the L a b color scale; focusing on b, the blue to yellow scale.

Adhesion of Mastic Coatings

Adhesion of the mastic coating to the APP mod-bit substrate was measured as follows. Approximately 20 g of the mastic coating was applied to APP mod-bit samples (7.5×16 cm). Embedded in the mastic were two 2.5 cm wide strips of polyester/cotton cloth. After the mastic dried for at least 14 days at 24° C. and 50% relative humidity, the peel strength (force per unit width) was measured ("dry adhesion"). Wet adhesion was measured after dry adhesion by soaking the dried mastic on APP mod-bit in deionized water for 7 days.

Example of the Effect of Binder Composition on Coating Blistering

Mastic samples were prepared for blistering measurements according to the procedure cited above.

The effect of various polymer compositions on the blistering of a Mastic coating on APP mod-bit. The blistering scale has two designations: size (2=large blisters, 8=very small blisters), and density (F=few, M=medium, MD=medium dense, D=dense) is illustrated in Table 2.

TABLE 2

| Latex # | Mastic | blister rating | wet adhesion (N/m) |
| --- | --- | --- | --- |
| Standard Latex A | 1 | 2 MD | 20 |
| Standard Latex A | 2 | 8 F | 90 |
| Latex 2 | 2 | 6 F | 180 |
| Latex 3 | 2 | 6 F | 260 |
| Latex 4 | 2 | 6 F | 310 |

Example of the Effect of Binder Composition on Coating Adhesion and Bleedthrough The effect of various polymer compositions on adhesion and bleedthrough of a Mastic coating on adhesion to APP mod-bit (wet and dry) is illustrated in Table 3.

TABLE 3

| Latex # | Mastic | bleed | dry ad. (N/m) | wet ad. (N/m) |
| --- | --- | --- | --- | --- |
| Standard Latex A | 1 | 4.3 | 30 | 30 |
| Comp B | 2 | 2.1 | 30 | 70 |
| Latex 2 | 2 | 2.5 | 90 | 180 |
| Latex 3 | 2 | 3.1 | 210 | 320 |
| Latex 5 | 2 | 2.0 | 280 | 330 |
| Latex 6 | 3 | 3.3 | 140 | 210 |
| Latex 7 | 3 | 11.5 | 140 | 190 |
| Latex 8 | 3 | 7.6 | 190 | 300 |
| Latex 9 | 3 | 9.7 | 400 | 630 |
| Latex 10 | 3 | 11.4 | 260 | 370 |

Example of the Effect of Hydrophobic Composition on Coating Adhesion

The effect of styrene and LMA level on adhesion of a Mastic coating (2) on adhesion to APP mod-bit (wet and dry) is illustrated in Table 4.

TABLE 4

| Latex # | Topcoat | dry ad. (N/m) | wet ad. (N/m) |
| --- | --- | --- | --- |
| Latex 11C | 2 | 30 | 70 |
| Latex 12 | 2 | 50 | 70 |
| Latex 13 | 2 | 160 | 250 |
| Latex 14 | 2 | 140 | 180 |
| Latex 4 | 2 | 390 | 460 |

Example of the Effect of Styrene and MAA Level on Coating Adhesion

The effect of acid and styrene level on the adhesion of a Mastic coating (3) on APP mod-bit (wet and dry) is illustrated in Table 5.

TABLE 5

| Latex # | dry ad. (N/m) | wet ad. (N/m) |
| --- | --- | --- |
| Latex 6 | 110 | 210 |
| Latex 15 | 440 | 790 |
| Latex 16 | 180 | 330 |
| Latex 17 | 90 | 140 |
| Latex 18C | — | 70 |
| Latex 19C | 50 | 80 |
| Latex 1 | 110 | 190 |
| Latex 20 | 70 | 120 |
| Latex 21 | 120 | 150 |
| Latex 22 | 160 | 190 |
| Latex 23 | 250 | 270 |

What is claimed is:

1. An aqueous emulsion composition suitable for use as a mastic topcoat or tiecoat comprising a water-insoluble latex polymer;

wherein said latex polymer has a Tg of from −25° C. to 20° C. and is prepared from a monomer mixture comprising:

(a) at least 20% by weight of at least one hydrophobic monomer selected from the group consisting of ($C_8$ to $C_{24}$) alkyl (meth)acrylates;

(b) 0 or up to 45% by weight of at least one vinyl aromatic monomer, wherein the weight of (a) and (b) together constitute at least 25% by weight of said monomer mix;

(c) 0 or up to 75% by weight of at least one monomer selected from the group consisting of ($C_1$ to $C_4$) alkyl (meth)acrylates; and (d) 0 or up to 5% by weight of at least one monomer selected from acrylic or methacrylic acid;

wherein when (b) is not present in the monomer mix the amount of (d) is in the range from 0 or up to less than 2.5% by weight.

2. A composition as claimed in claim 1, wherein the at least one hydrophobic monomer (a) is selected from the group consisting of ethylhexyl acrylate (EHA), octyl methacrylate, isooctyl methacrylate, decyl methacrylate (n-DMA), isodecyl methacrylate (IDMA), lauryl methacrylate (LMA), pentadecyl methacrylate, stearyl methacrylate (SMA), octyl acrylate, isooctyl acrylate, decyl acrylate, isodecyl acrylate, lauryl acrylate (LA) and the (C12 to C15) alkyl methacrylates.

3. A composition as claimed in claim 1, wherein the at least one vinyl aromatic monomer (b) is selected from the group consisting of styrene (Sty), vinyl toluene, 2-bromo styrene, o-bromo styrene, p-chloro styrene, o-methoxy styrene, p-methoxy styrene, allyl phenyl ether, allyl tolyl ether and alpha-methyl styrene.

4. A composition as claimed in claim 1, wherein the ($C_1$ to $C_4$) alkyl (meth)acrylates (c) is selected from the group consisting of methyl methacrylate (MMA), ethyl acrylate (EA), and butyl acrylate (BA).

5. A composition as claimed in claim 1, wherein the latex polymer has a weight average molecular weight from 10,000 to 150,000.

* * * * *